United States Patent
Ueda

(10) Patent No.: US 8,333,226 B2
(45) Date of Patent: Dec. 18, 2012

(54) PNEUMATIC TIRE WITH TREAD HAVING FIRST AXIAL GROOVES AND CIRCUMFERENTIAL GROOVES INCLUDING WAVY CIRCUMFERENTIAL GROOVE

(75) Inventor: Kenji Ueda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 281 days.

(21) Appl. No.: 12/540,477

(22) Filed: Aug. 13, 2009

(65) Prior Publication Data
US 2010/0101695 A1    Apr. 29, 2010

(30) Foreign Application Priority Data
Oct. 28, 2008   (JP) .................. 2008-277308

(51) Int. Cl.
  B60C 11/03    (2006.01)
  B60C 11/11    (2006.01)
(52) U.S. Cl. ............. 152/209.18; 152/209.28; 152/902; 152/903
(58) Field of Classification Search ............ 152/209.18, 152/209.26, 209.28, 902, 903; D12/548, D12/552, 559, 564
See application file for complete search history.

(56) References Cited

U.S. PATENT DOCUMENTS
5,567,253 A * 10/1996 Iwamura ............. 152/209.28
5,924,464 A *  7/1999 White .................. 152/209.21

FOREIGN PATENT DOCUMENTS
| EP | 1 036 674 A2 |   | 9/2000 |
| EP | 1 437 237 A2 |   | 7/2004 |
| JP | 55-140604 A  |   | 11/1980 |
| JP | 03-139402    | * | 6/1991 |
| JP | 05-278408    | * | 10/1993 |
| JP | 06-106915    | * | 4/1994 |
| JP | 7-117414 A   |   | 5/1995 |
| JP | 2002-274126 A |  | 9/2002 |
| JP | 4145346 B1   |   | 6/2008 |
| WO | WO 2005/005169 A1 | | 1/2005 |

OTHER PUBLICATIONS

Machine translation for Japan 06-106915 (no date).*
Machine translation for Japan 05-278408 (no date).*
Translation for Japan 03-139402 (no date).*

* cited by examiner

Primary Examiner — Steven D Maki
(74) Attorney, Agent, or Firm — Birch, Stewart, Kolasch & Birch, LLP

(57) ABSTRACT

A pneumatic tire comprises a tread portion (2) provided with a wavy circumferential groove (7) and a plurality of axial grooves (4). At the junction (5) of each axial groove (4) with the wavy circumferential groove (7), a acute-angled corner (6) is formed. At the junction (5), the axial groove (4) has a toe-side edge (4r) intersecting a junction-side edge (7a) of the wavy circumferential groove (7) at a first point (P1), and a heel-side edge (4f) intersecting the junction-side edge (7a) at a third point (P3). The first point (P1) is positioned between a second intersecting point (P2) and a junction-side maximum amplitude points (RL0) wherein the second intersecting point (P2) is that between the junction-side edge (7a) and a maximally-inclined tangent (Ka) to an opposite-of-junction-side edge (7b) of the wavy circumferential groove (7), and the junction-side maximum amplitude point (RL0) is a point on the junction-side edge (7a) at which the junction-side edge (7a) protrude maximally towards the junction-side.

9 Claims, 6 Drawing Sheets

PNEUMATIC TIRE WITH TREAD HAVING FIRST AXIAL GROOVES AND CIRCUMFERENTIAL GROOVES INCLUDING WAVY CIRCUMFERENTIAL GROOVE

BACKGROUND OF THE INVENTION

The present invention relates to a pneumatic tire, more particularly to a geometrical arrangement of a wavy circumferential groove and axial grooves provided in the tread portion.

In general, a pneumatic tire is provided in the tread portion with circumferential grooves and axial grooves in order to improve the wet-grip performance. In many cases, axial grooves designed for a pneumatic tire suitable for high speed running are inclined to one circumferential direction, forming a unidirectional tread pattern, in order to promote the removal of water from the ground contacting patch. Further, in order to smoothen the flow of water from the circumferential groove (s) disposed in a tread central region to the inclined axial grooves, the axial grooves are connected with the circumferential groove at relatively small intersecting angles. Therefore, the tread element such as block formed between the axial groove and the circumferential groove is provided with an acute-angled corner. The acute-angled corner is very liable to deform during running due to the relatively low rigidity. As a result, there arise problems of uneven wear of the tread portion starting from the acute-angled corners, and decrease in the cornering power which results in a deterioration of the steering stability.

SUMMARY OF THE INVENTION

It is therefore, an object of the present invention to provide a pneumatic tire, in which, the substantive rigidity and apparent rigidity of the acute-angled corners formed between axial grooves and a circumferential groove are increased, and the deformation and movements of the acute-angled corner during running can be lessened, and thereby the steering stability can be improved, without sacrificing the drainage or water flow from the circumferential groove to the axial grooves.

According to the present invention, a pneumatic tire comprises a tread portion provided with a wavy circumferential groove and a plurality of axial grooves joining the wavy circumferential groove so that, at the junction of each of the axial grooves with the wavy circumferential groove, an acute-angled corner (6) is formed between the axial groove and the wavy circumferential groove, wherein at the above-mentioned junction of each of the axial grooves, the axial groove has a toe-side edge (4r) intersecting a junction-side edge (7a) of the wavy circumferential groove at a first intersecting point (P1), and a heel-side edge (4f) intersecting the junction-side edge (7a) at a third intersecting point (P3), and the above-mentioned first intersecting point (P1) is positioned between a second intersecting point (P2) and a junction-side maximum amplitude point (RL0)
wherein the second intersecting point (P2) is an intersecting point between the above-mentioned junction-side edge (7a) and one of maximally-inclined tangents (Ka), the maximally-inclined tangents (Ka) are tangents to an opposite-of-junction-side edge (7b) of the wavy circumferential groove which are inclined with respect to the tire circumferential direction maximally to the junction-side edge (7a) towards the toe-side, and the junction-side maximum amplitude point (RL0) is one of junction-side maximum amplitude points (RL) which is positioned adjacent to the second intersecting point (P2) on the heel-side thereof, and the junction-side maximum amplitude points (RL) are defined as points on the junction-side edge (7a) at which the junction-side edge (7a) protrudes maximally towards the junction-side edge (7a).

DEFINITIONS

The terms specific to the description and claims in this application are defined as follows.

The term "junction-side edge" means one of the edges (7a and 7b) of the wavy circumferential groove at which an axial groove 4 concerned is connected to the wavy circumferential groove.

The term "opposite-of-junction-side edge" therefore, means the other edge.

If an axial groove 4 concerned joins the wavy circumferential groove 7 at the edge 7a (in the left side in FIGS. 6A and 6B), then for the axial groove 4 concerned, the "junction-side edge" is 7a, and the "opposite-of-junction-side edge" is 7b.

If the axial groove 4 joins the wavy circumferential groove 7 at the edge 7b (in the right side in FIGS. 6A and 6B), then for the axial groove 4 concerned, the "junction-side edge" is 7b, and the "opposite-of-junction-side edge" is 7a.

The terms "junction-side" and "opposite-of-junction-side" are also used in similar sense. Namely, the term "junction-side" means one side of the wavy circumferential groove on which an axial groove concerned is located. Therefore, the term "opposite-of-junction-side" means the other side.

Thus, the opposite terms "junction-side edge" and "opposite-of-junction-side edge" and the opposite terms "junction-side" and "opposite-of-junction-side" are relative to individual axial grooves 4, and the meanings of these terms turn in the case that the axial grooves are connected to both of the edges 7a and 7b of the wavy circumferential groove 7.

The terms "toe-side edge" and "heel-side edge" mean one edge and the other edge corresponding to the "front side edge" and "rear side edge" in the ground contacting patch in the traveling direction when the tire rolls in the intended tire rotational direction.

The opposite terms "toe-side" and "heel-side" are also used in similar sense.

The width of a groove means a width measured at the tread face perpendicularly to the widthwise centerline of the groove unless otherwise noted.

In the present invention, therefore, by positioning the first intersecting point P1 in a region between the second intersecting point P2 and junction-side maximum amplitude point RL0, the intersecting angle of the axial groove with the circumferential groove can be increased, without increasing the inclination angle of the axial groove.

By positioning the first intersecting point P1 in the same region, the water flowing in the circumferential groove can be smoothly split into the axial groove, without disturbing the mainstream in the circumferential groove.

As a result, the acute-angled corners are increased in the rigidity without sacrificing the drainage performance, and thereby the steering stability can be improved, while maintaining the wet-grip performance.

DESCRIPTION OF THE PREFERRED EMBODIMENTS

The present invention suitably applied to pneumatic tires for passenger cars, Suv and the like. Therefore, taking a passenger car radial tire as example, embodiments of the present invention will now be described in detail in conjunction with accompanying drawings.

As well known in the art, a passenger car radial tire comprises: a tread portion comprising a tread rubber and a tread reinforcing belt; a pair of sidewall portions each comprising a sidewall rubber; a pair of bead portions each comprising a bead core and rubber components; and a carcass extending between the bead portions through the tread portion and sidewall portions. The detailed explanations are omitted.

Figure 1:
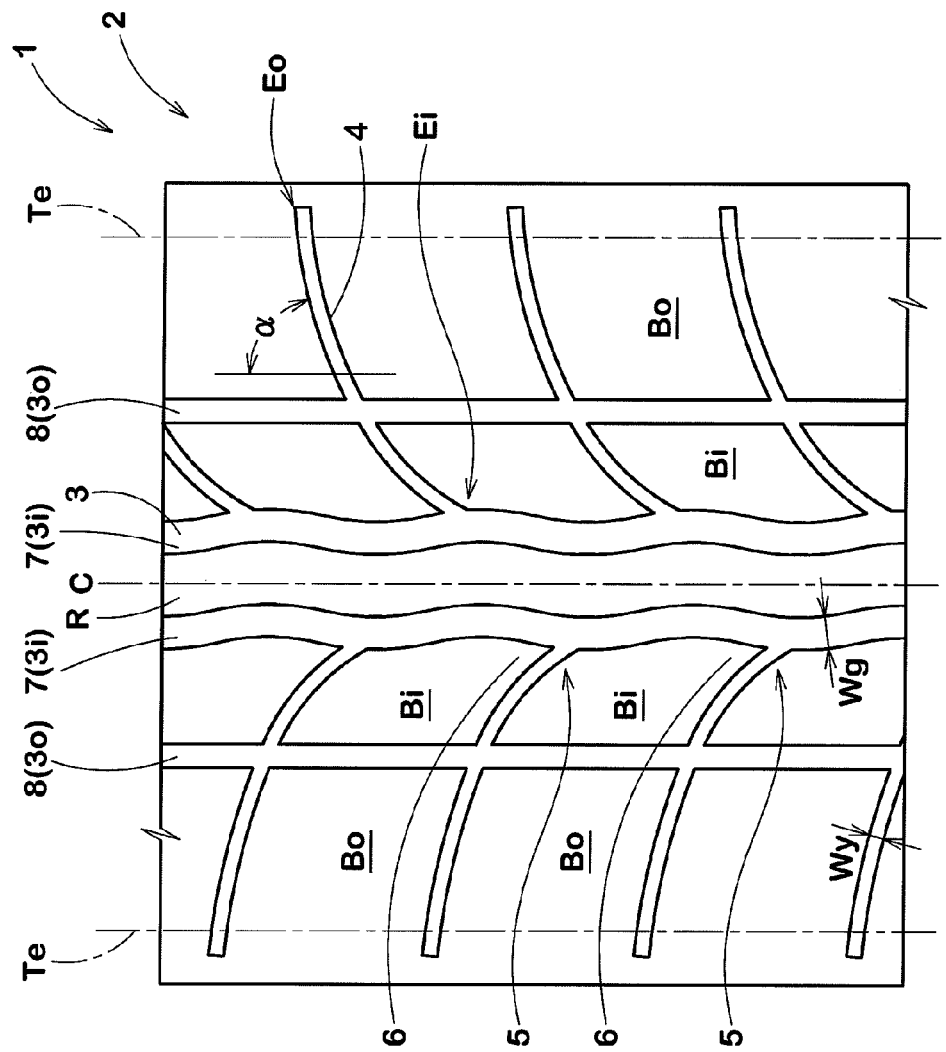
FIG. 1 is a developed partial plan view of a pneumatic tire according to the present invention showing a tread pattern.
Figure 2:
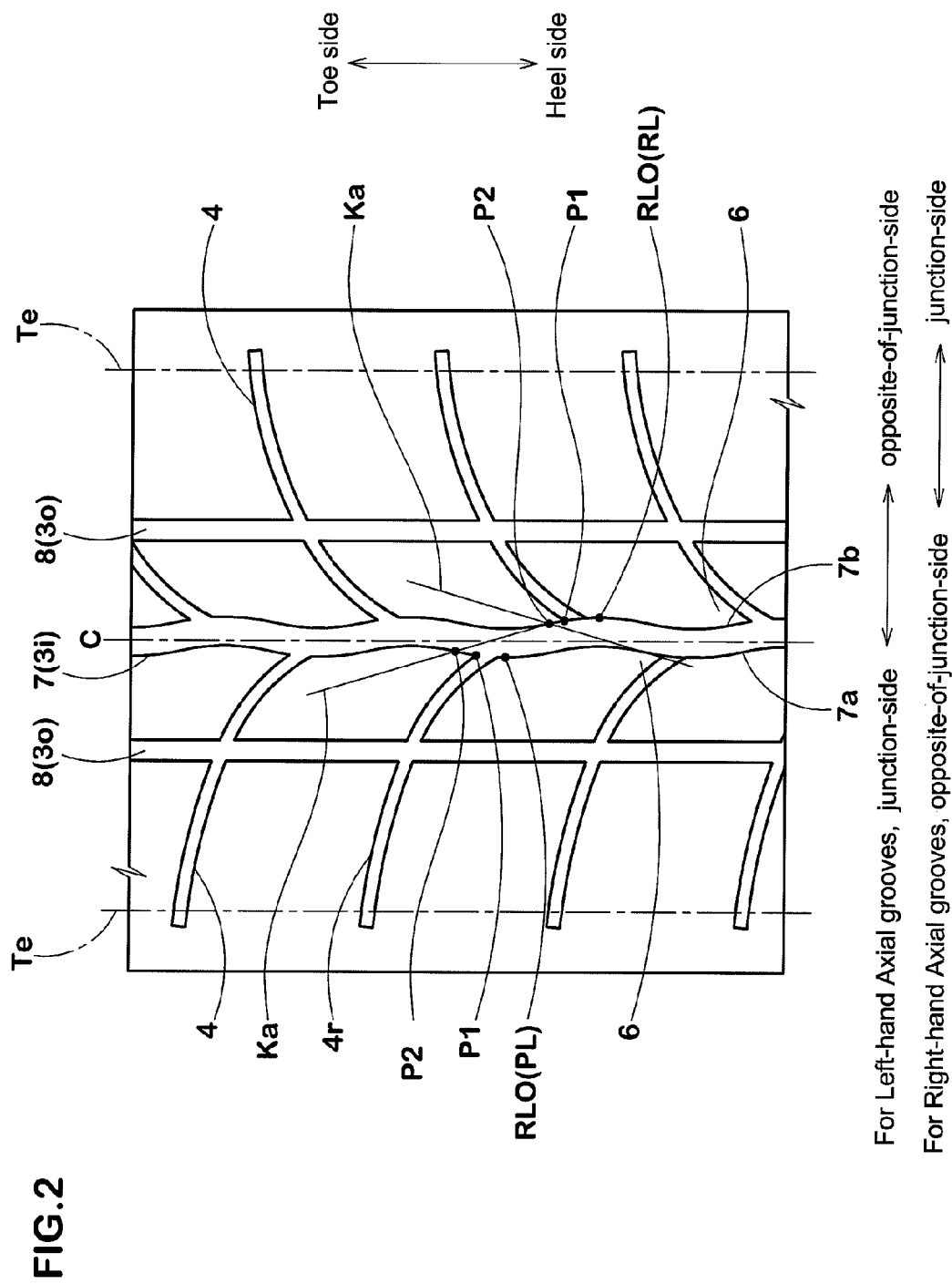
FIG. 2 is a developed partial plan view of a pneumatic tire according to the present invention showing another example of the tread pattern.

According to the present invention, the tire 1 is provided in the tread portion 2 with at least one wavy circumferential groove 7 extending continuously in the tire circumferential direction, and a plurality of axial grooves 4 joining the wavy circumferential groove 7 as shown in FIG. 1 and FIG. 2.

The axial grooves 4 extends axially outwardly from the wavy circumferential groove 7 or grooves 7 beyond the tread edges Te, while inclining to one circumferential direction which direction, in the ground contacting patch, corresponds to the traveling direction of the tire when the tire rolls in the intended rotational direction of the tire.

Each of the axial grooves 4 accordingly, has the axially inner end Ei positioned at the circumferential groove 3i and the axially outer end Eo positioned axially outside the tread edge Te.

The tread portion 2 is thus provided with a unidirectional tread pattern having an intended tire rotational direction.

In FIG. 1 showing a first embodiment, the tread portion 2 is provided on each side of the tire equator c with a circumferentially continuously extending circumferential groove 3i, and a circumferentially continuously extending circumferential groove 3o disposed on the axially outside of the main circumferential groove 3i. Between the circumferential grooves 3i, a circumferentially continuously extending rib R is formed.

In this embodiment, each of the axially inner circumferential grooves 3i is the above-mentioned wavy circumferential groove 7, and each of the axially outer circumferential grooves 3o is a straight circumferential groove 8. The axial grooves 4 extend axially outwards, starting from the axially outer edge of each of the wavy circumferential grooves 7. The above-mentioned rib R is therefore a wavy rib.

In FIG. 2 showing a second embodiment, the tread portion 2 is provided with a circumferentially continuously extending circumferential groove 3i disposed on the tire equator C, and a pair of circumferentially continuously extending circumferential groove 3o disposed one on each side of the tire equator C. In this embodiment, the single circumferential groove 3i is the above-mentioned wavy circumferential groove 7, and each of the axially outer circumferential grooves 3o is a straight circumferential groove 8. The axial grooves 4 extend axially outwards, starting from each of the edges of the single wavy circumferential groove 7.

In this case it is not always necessary that the center of the amplitude of wave of the wavy circumferential groove 7 coincides with the tire equator C. The center of the amplitude may be off the tire equator C as far as the tire equator C is positioned within the amplitude of the wave or the axial extent of the wavy circumferential groove 7.

In the above two embodiments shown in FIGS. 1 and 2, the straight circumferential grooves 8 intersect the axial grooves 4, therefore, the tread portion 2 is divided into: two circumferential rows of axially inner blocks Bi formed between the circumferential grooves 3i and 3o; and two circumferential row of axially outer shoulder blocks Bo formed between the circumferential groove 3o and the tread edge Te on each side of the tire equator.

The wavy circumferential groove 7 extends zigzag in the tire circumferential direction, and each of the zigzag edges 7a and 7b thereof can be formed by curved line segments and/or straight line segments. The zigzag edges 7a and 7b are substantially parallel with each other.

Figure 3:
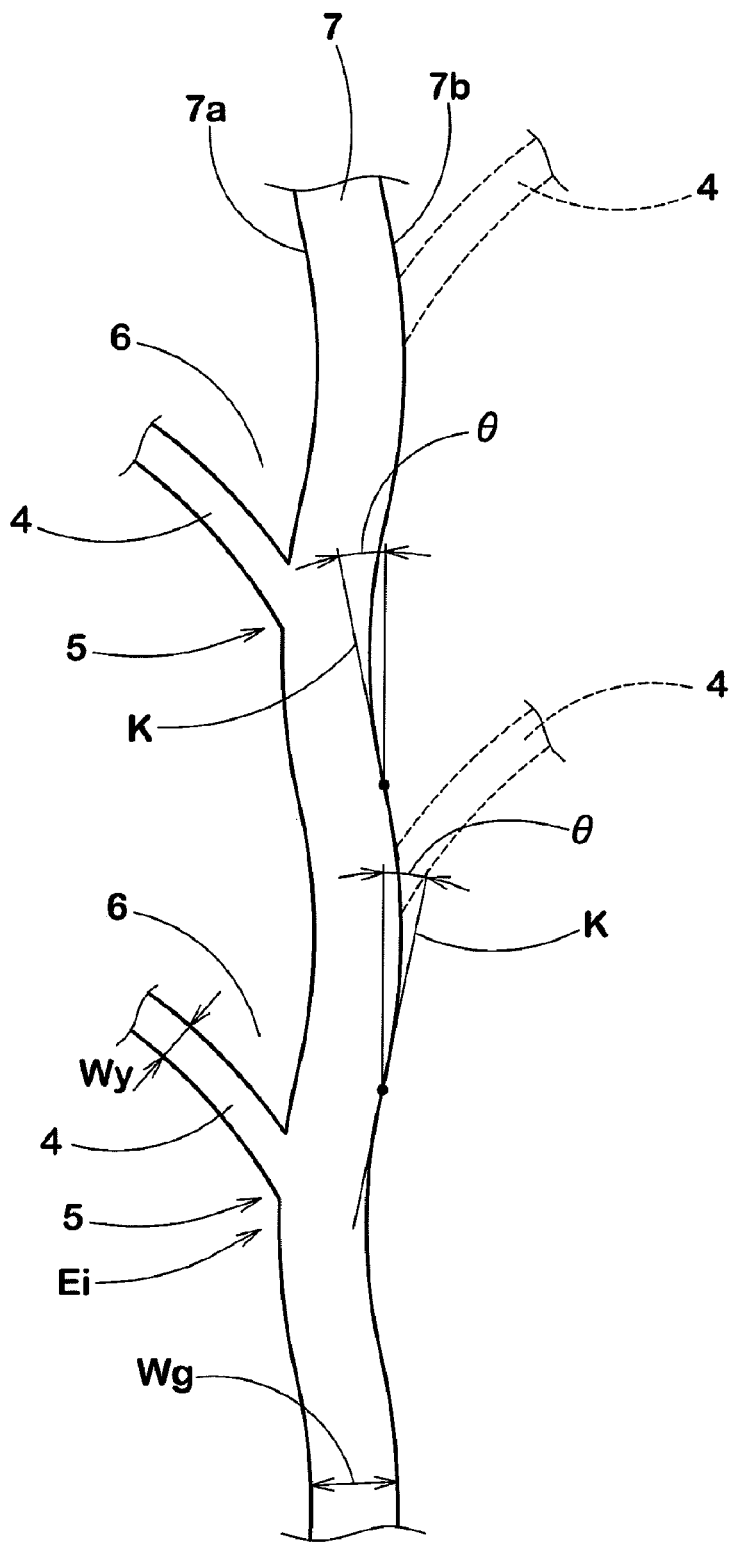
FIG. 3 is an enlarged view showing a wavy circumferential groove and axial grooves.

If the amplitude of wave of the wavy circumferential groove 7 is too large, the resistance to water flow is increased and the drainage is deteriorated. In this light, as shown in FIG. 3, when the angle θ of tangent K to the circumferential groove edge 7a, 7b is measured along the length thereof, the maximum angle θ1 is preferably limited in a range of not less than 5 degrees, more preferably not less than 10 degrees, but not more than 25 degrees, more preferably not more than 20 degrees with respect to the tire circumferential direction. If the maximum angle θ1 is more than 25 degrees, the resistance to water flow is increased and the drainage is deteriorated. If the maximum angle θ1 is less than 5 degrees, it becomes difficult to obtain the advantageous effect of the present invention to increase the rigidity of the acute-angled corner 6.

In the above two embodiments, each of the edges 7a and 7b is formed by curved line segments only which describes a smoothly-curved zigzag waveform like a sinusoidal waveform. More specifically, each of the edges 7a and 7b is formed by alternately arranging convex and concave circular arcs having substantially identical radii and substantially identical lengths, without forming an inflection point between the convex and concave circular arcs. In this case, the above-mentioned maximum angle θ1 occurs at the junction points between the convex and concave circular arcs.

Figure 4:
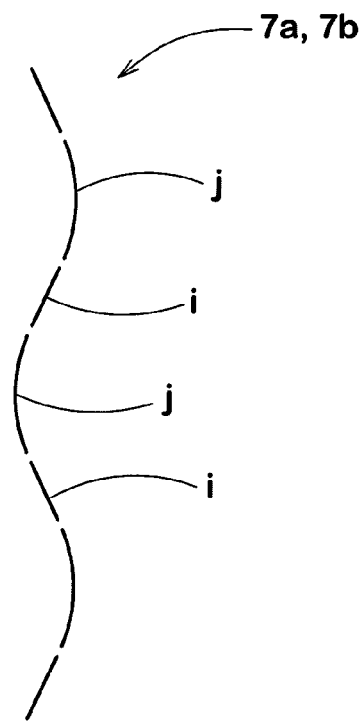
FIGS. 4 and 5 are diagrams showing other examples of the configuration of the edges of the wavy circumferential groove.
Figure 5:
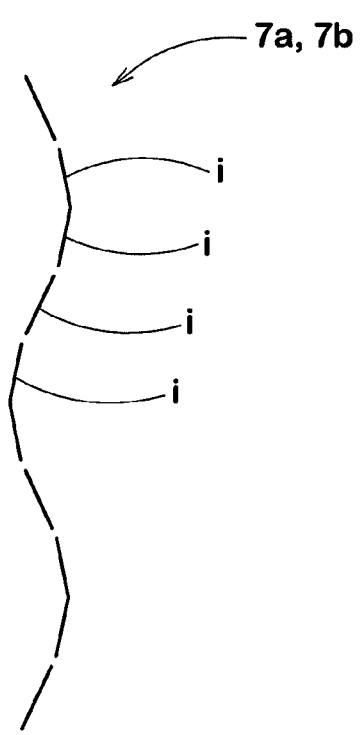

Instead of using the curved line segments only, as schematically shown in FIG. 4, both of curved line segments (j) and straight line segments (i) can be used in combination to form each edge 7a, 7b. Further, as schematically shown in FIG. 5, it is also possible to use straight line segments (i) only by gradually and periodically changing their inclination angles. In these two cases, the line segments (i, j) has to be arranged to resemble a smoothly-curved zigzag waveform. In the latter case especially, it is preferable that at least four, preferably at least six straight line segments (i) having different inclination angles are used per one-half wavelength of the zigzag waveform. Most preferably, both of the edges 7a and 7b are formed with a smoothly-curved zigzag waveform having no bent point (discontinuous point of the curvature change) by using curved line segments only or curved line segments and straight line segments in combination because if there are bent points, the resistance to water flow increases and the drainage is deteriorated.

The number of waves (or cycles) of the wavy circumferential groove 7 around the tire is equal to the number of the axial grooves 4 joining one of the edges 7a and 7b multiplied by an integral number.

In the two embodiments, the integral number is 1, therefore, the number of waves is equal to the number of the axial grooves 4.

The wavy circumferential groove 7 has a width Wg in a range of from 5 to 15 mm, and a depth Hg in a range of from 3 to 10 mm. But, the width Wg and depth Hg are not to be limited to the values in the above ranges which rages are preferable for the passenger car tires. The ranges may be varied depending on the tire size, intended use and the like.

With respect to each of the axial grooves 4, at the junction 5 with the wavy circumferential groove 7, an acute-angled corner 6 of tread block is formed between the axial groove 4 and the wavy circumferential groove 7.

In the two embodiments, in order to lead the water in the axial grooves 4 to the outside of the ground contacting patch accompanying water stream, the angle a of each of the axial grooves 4 with respect to the tire circumferential direction is increased gradually with the distance of the measuring point from the wavy circumferential groove 7 is increased.

The axial groove 7 has a width Wy in a range of from 5 to 15 mm, and a depth Hy in a range of from 3 to 15 mm. But, the width Wy and depth Hy are not to be limited to the values in the above ranges which ranges are preferable for the passenger car tires. The ranges may be varied depending on the tire size, intended use and the like.

Figure 6:
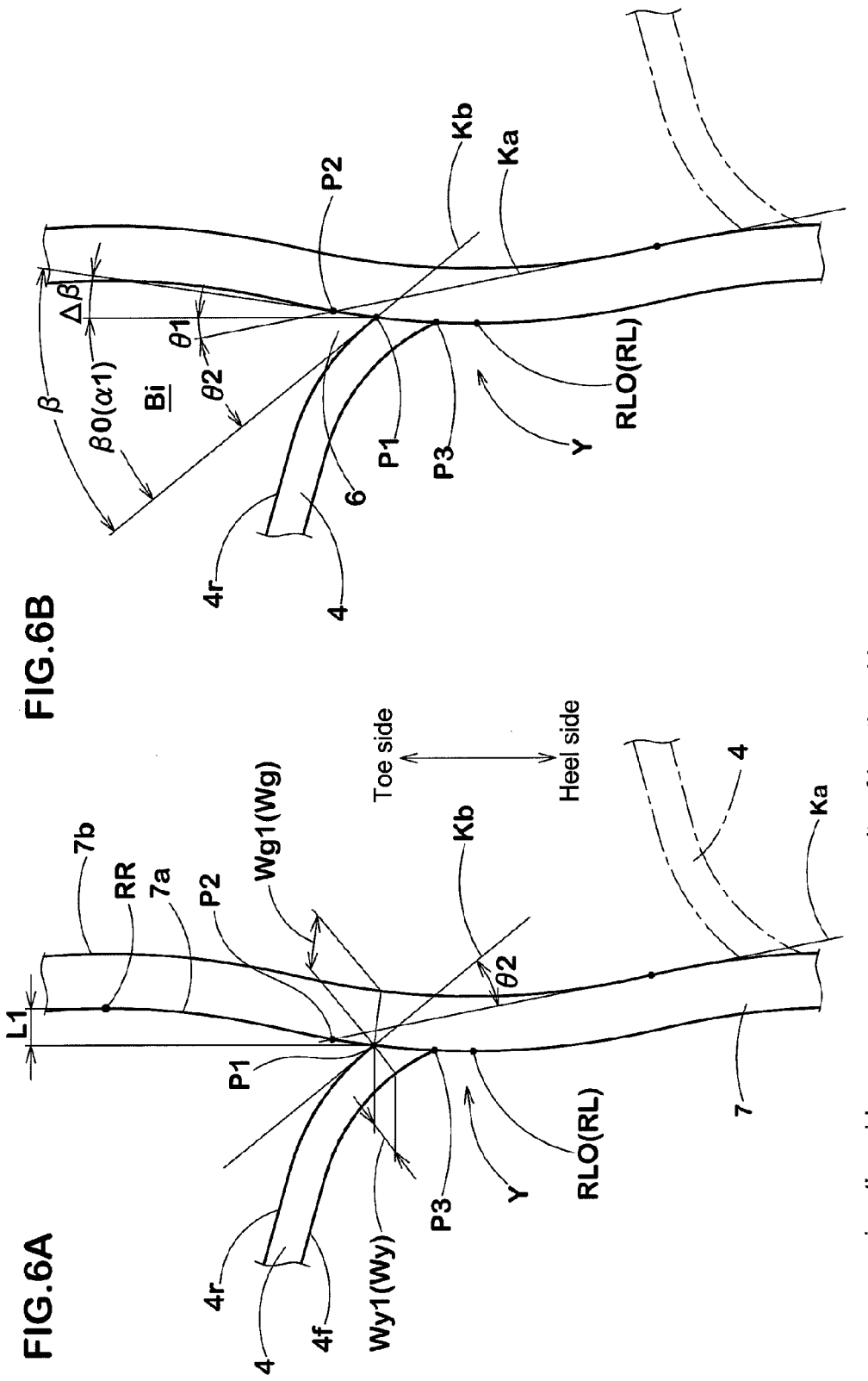
FIGS. 6A and 6B are enlarged views showing the connection between one of the axial grooves and the wavy circumferential groove.

Next, the junction 5 of each of the axial grooves 4 with the wavy circumferential groove 7 will be described in detail in conjunction with FIGS. 3, 6A and 6B showing the embodiment of FIG. 1 where one of the edges of the wavy circumferential groove 7 is connected by the axial grooves 4. However, the description is also applied to the embodiment shown in FIG. 2 where each of the edges of the wavy circumferential groove 7 is connected by the axial grooves 4.

With respect to the junction 5 of each axial groove 4, the toe-side edge 4r of the axial groove 4 and the junction-side edge 7a of the wavy circumferential groove 7 intersect at a first intersecting point P1, and the heel-side edge 4f of the axial groove 4 and the junction-side edge 7a of the wavy circumferential groove 7 intersect at a third intersecting point P3.

According to the present invention, the above-mentioned first intersecting point P1 is positioned in a region Y, which is defined between the second intersecting point P2 and the junction-side maximum amplitude point RL0. Thereby, as shown in FIG. 6B, the angle β between the axial groove 4 and wavy circumferential groove 7 can be increased by an angle Δβ when compared with the angle β0 in the case of a straight circumferential groove not the wavy circumferential groove 7. In other words, it is possible to increase the rigidity of the acute-angled corner 6 at the first intersecting point P1, without increasing the angle α1 of the axial groove 4 at the first intersecting point P1. Therefore, the axially inner blocks Bi having the acute-angled corner 6 is increased in the rigidity to increase the cornering power. And the steering stability can be improved and the occurrence of uneven wear starting from the acute-angled corner 6 can be controlled.

On the other hand, by setting the position of the first intersecting point P1 within the region Y, the main water stream in the wavy circumferential groove 7 can be split into the axial groove 4 while maintaining the smooth main stream. Therefore, the wet-grip performance can be maintained or improved.

If the first intersecting point P1 is outside the region Y, it becomes hard to smoothly split the main water stream in the wavy circumferential groove 7 into the axial groove 4, and the drainage performance is deteriorated.

Further, it is preferable that the third intersecting point P3 is positioned in the region Y between the second intersecting point P2 and junction-side maximum amplitude point RL0. By setting the position of the third intersecting point P3 on the toe-side of the junction-side maximum amplitude point RL0, it becomes easy for the split flow from the main water stream in the wavy circumferential groove 7 to turn the flowing direction thereof in a position around the junction-side maximum amplitude point RL0. Thereby the drainage performance can be improved. If the third intersecting point P3 is positioned on the heel-side of the junction-side maximum amplitude point RL0, the drainage efficiency of the wavy circumferential groove 7 is decreased, and the drainage performance as a whole is deteriorated.

The acute angle θ2 between the tangent Kb to the toe-side edge 4r of the axial groove at the first intersecting point P1 and the above-mentioned one of maximally-inclined tangents Ka inclined at the maximum angle θ1, is preferably not more than 45 degrees, more preferably not more than 35 degrees, but preferably not less than 10 degrees.

If the angle θ2 exceeds 45 degrees, the angle α1 of the axial groove 4 at the first intersecting point P1 becomes too large, and the axial groove 4 can not display its prominent drainage performance and wet-grip performance.

If the angle θ2 is less than 10 degrees, the angle β becomes too small, and the steering stability can not be improved. Incidentally, the angle α1 of the axial groove 4 is equal to the sum (θ1+θ2) of the angles θ1 and θ2.

Preferably, the axial distance L1 between the first intersecting point P1 and one of opposite-of-junction-side maximum amplitude points RR positioned adjacent to the first intersecting point P1 is set in a range of from 2 to 30 mm, wherein the opposite-of-junction-side maximum amplitude points RR are defined as points on the junction-side edge 7a at which the junction-side edge 7a protrudes maximally towards the opposite-of-junction-side edge 7b.

If the distance L1 is less than 2 mm, the effect to increase the rigidity of the acute-angled corner 6 becomes not enough. If the distance L1 is more than 30 mm, the wavy circumferential groove 7 is excessively increased in the number and/or amplitude of waves. This has a disadvantage for the drainage performance.

Preferably the width Wy1 of the axial groove 4 at the first intersecting point P1 is set in a range of from 50 to 100% of the width wg1 of the wavy circumferential groove 7 at the first intersecting point P1. If the axial groove width Wy1 is outside this range, the drainage by the wavy circumferential groove 7 and the drainage by the axial grooves 4 become bad balanced, and the drainage of the tread pattern as a whole tends to decrease.

In the two embodiments, the width Wy of each of the axial grooves 4 is constant along its length.

But, it is also preferable that the width Wy is decreased with the distance of the measuring point from the wavy circumferential groove 7 is increased because, by maximizing the width Wy1 of the axial groove at the first intersecting point P1, the water flow from the wavy circumferential groove 7 into the axial groove can be made smooth. Since the axial groove width Wy gradually decreases towards the axially outer end Eo, the tread rigidity during cornering can be increased to improve the steering stability during cornering.

In the embodiment shown in FIG. 2, as a result of the above-explained positioning of each axial groove 4, the axial grooves 4 on both sides of the single wavy circumferential groove 7 are staggered.

In order to improve the uneven wear resistance and prevent chipping-off of the pointed corner, the above-mentioned acute-angled corner 6 can be chamfered or cut off by a plane or a curved surface sloping towards the groove bottom at the first intersecting point P1. In this case, since the acute-angled corner 6 is increased in the rigidity, the cut off volume can be lessened, and accordingly, the deterioration of the steering stability due to the chamfering can be lessened.

Comparison Tests

Radial tires of size 195/65R15 for passenger cars were made and tested for the steering stability and wet-grip performance.

Specifications of the test tires are shown in Table 1, otherwise the test tires had substantially same structures.

(1) Steering Stability Test:

A 2000 cc FF passenger car provided on all the four wheels with a test tire mounted on a wheel rim of size 6J×15 and inflated to 180 kPa was run on a dry asphalt road surface in a tire test course, and the steering stability was evaluated by the test driver. The results are indicated in Table 1 by an index based on Ex.1 being 100, wherein the larger the value, the better the steering stability.

(2) Wet-Grip Performance Test:

The test tire mounted on a wheel rim of size 6J×15 was run on the wet inside face of a tire test drum, and the cornering force was continuously measured during increasing the running speed. When the cornering force was decreased to 50% of its maximum value, the tire was judged as causing a hydroplaning phenomenon, and the running speed thereat was measured as the critical speed of hydroplaning. The running conditions were as follows: the depth of water covering the inside face of the tire test drum was 5 mm, the vertical tire load was 4 kN, the slip angle of the tire was 1 degree, and the tire inflation pressure was 180 kPa.

The invention claimed is:

1. A pneumatic tire comprising:
a tread portion provided with circumferential grooves extending continuously in the circumferential direction of the tire and axial grooves joining the circumferential grooves,
said circumferential grooves including a wavy circumferential groove, and
said axial grooves including first axial grooves joining the wavy circumferential groove so that
at the junction of each of the first axial grooves with the wavy circumferential groove, an acute-angled corner is formed between the first axial groove and the wavy circumferential groove, and
at said junction of each of the first axial grooves, the first axial groove has a toe-side edge intersecting a junction-side side edge of the wavy circumferential groove at a first intersecting point (P1), and a heel-side edge intersecting said junction-side side edge at a third intersecting point (P3), wherein
the first intersecting point (P1) is positioned between a second intersecting point (P2) and one of junction-side maximum amplitude points (RLO) which is positioned adjacently to the second intersecting point (P2) on the heel-side,
the second intersecting point (P2) is an intersecting point between said junction-side side edge and one of maximally-inclined tangents (Ka),
the maximally-inclined tangents (Ka) are tangents to an opposite-of-junction-side side edge of the wavy circumferential groove which are inclined, with respect to the circumferential direction, maximally to the junction-side side edge towards the toe-side,
said junction-side maximum amplitude points (RLO) are points on the junction-side side edge at which the junction-side side edge protrudes maximally towards the junction-side, and
said third intersecting point (P3) is positioned between the second intersecting point (P2) and the junction-side maximum amplitude point (RLO), wherein

TABLE 1

Figure 7:
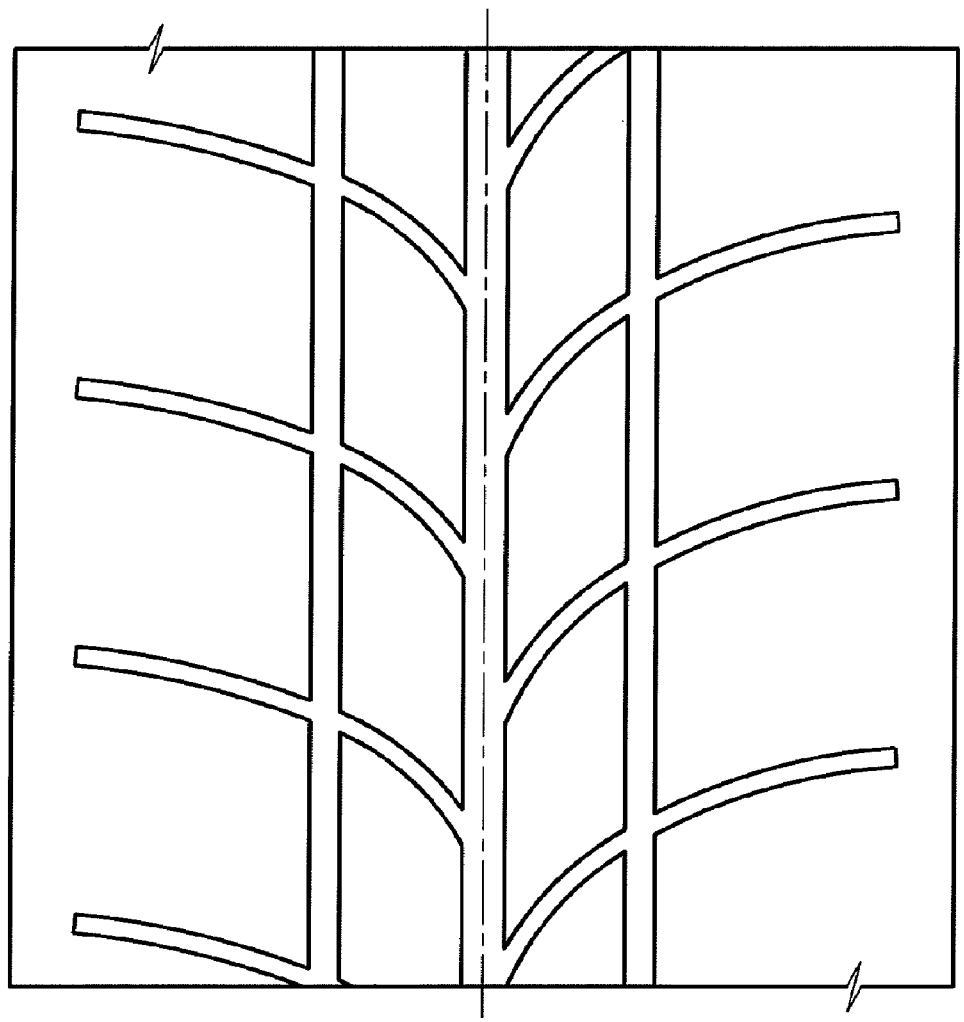
FIG. 7 shows a tread pattern used in the undermentioned comparison tests.

| Tire | Ref. 1 | Ref. 2 | Ref. 3 | Ex. 1 | Ex. 2 | Ex. 3 |
|---|---|---|---|---|---|---|
| Tread pattern | FIG. 7 | FIG. 7 | FIG. 7 | FIG. 2 | FIG. 2 | FIG. 2 |
| Circumferential groove 3i | | | | | | |
| configuration | straight | straight | straight | wavy | wavy | wavy |
| number of waves | — | — | — | 30 | 30 | 30 |
| angle θ1 (deg.) | — | — | — | 10 | 10 | 10 |
| angle θ2 (deg.) | — | — | — | 20 | 35 | 50 |
| distance L1 (mm) | — | — | — | 5.3 | 5.3 | 5.3 |
| width (mm) | 10 | 10 | 10 | 10 | 10 | 10 |
| depth (mm) | 10 | 10 | 10 | 10 | 10 | 10 |
| Circumferential grooves 3o | | | | | | |
| width (mm) | 8 | 8 | 8 | 8 | 8 | 8 |
| depth (mm) | 10 | 10 | 10 | 10 | 10 | 10 |
| Axial groove | | | | | | |
| angle α1 at inner end (deg.) | 30 | 45 | 60 | 30 | 45 | 60 |
| width (mm) | 8 | 8 | 8 | 8 | 8 | 8 |
| depth (mm) | 10 | 10 | 10 | 10 | 10 | 10 |
| number *1 | 30 | 30 | 30 | 30 | 30 | 30 |
| Position of P1 | — | — | — | within Y | within Y | within Y |
| Position of P3 | — | — | — | within Y | within Y | within Y |
| Test results | | | | | | |
| Steering stability | 66 | 76 | 99 | 70 | 78 | 100 |
| Wet-grip performance | 62 | 58 | 51 | 63 | 59 | 53 |

*1 The number of the axial grooves joining one of the edges of the circumferential groove 3i.

said junction-side side edge and said opposite-of-junction-side side edge of the wavy circumferential groove are each formed by a curved line and are substantially parallel with each other, and there is no groove extending from the junction-side edge other than the first axial grooves which extends axially outwardly to the tread edge while inclining to one circumferential direction at an inclination angle (α) with respect to the tire circumferential direction, which angle (α) increases as the axial distance from the wavy circumferential groove is increased, so that the first axial grooves are curved.

2. The pneumatic tire according to claim 1, wherein the angle θ1 of the maximally-inclined tangent (Ka) is in a range of from 5 to 25 degrees with respect to the tire circumferential direction.

3. The pneumatic tire according to claim 1, wherein the acute angle θ2 between the maximally-inclined tangent (Ka) and a tangent (Kb) to the toe-side edge of the first axial groove at the first intersecting point (P1) is not more than 45 degrees.

4. The pneumatic tire according to claim 1, wherein
the axial distance between the first intersecting point (P1) and an opposite-of-junction-side maximum amplitude point (RR) is in a range of from 2 to 30 mm, wherein
the opposite-of-junction-side maximum amplitude point (RR) is a point on the junction-side edge at which the junction-side edge protrudes maximally towards the opposite-of-junction-side.

5. The pneumatic tire according to claim 1, wherein the width of the first axial groove at the first intersecting point (P1) is in a range of from 50 to 100% of the width of the wavy circumferential groove at the first intersecting point (P1).

6. The pneumatic tire according to claim 1, wherein the width of the first axial groove decreases as the distance from the wavy circumferential groove is increased.

7. The pneumatic tire according to claim 1, wherein
the wavy circumferential groove is disposed on the tire equator,
the first axial grooves are disposed on both sides of the wavy circumferential groove and join both of the edges of the wavy circumferential groove, and
the first axial grooves on both sides of the wavy circumferential groove are arranged in a staggered manner.

8. The pneumatic tire according to claim 1, wherein
the wavy circumferential groove is disposed on each side of the tire equator,
the first axial grooves are disposed axially outside of the wavy circumferential grooves, and
the first axial grooves join only the axially outer edge of each of the wavy circumferential grooves.

9. The pneumatic tire according to claim 1, wherein said circumferential grooves include a straight circumferential groove disposed between the wavy circumferential groove and the tread edge and crossed by said first axial grooves extending from the junction-side edge to the tread edge.

* * * * *